(12) United States Patent
Kadoko et al.

(10) Patent No.: US 12,162,225 B2
(45) Date of Patent: Dec. 10, 2024

(54) AUTOMATED ULTRASONIC WELDING OF CABLE TIES

(71) Applicant: ABB Schweiz AG, Baden (CH)

(72) Inventors: Jonah Kadoko, Mint Hill, NC (US); Daniel Armstrong, Apex, NC (US); Matthew Hetrich, Raleigh, NC (US); Sheng Zhong, Hillsborough, NC (US); Goran Mandic, Wake Forest, NC (US)

(73) Assignee: ABB SCHWEIZ AG, Baden (CH)

(*) Notice: Subject to any disclaimer, the term of this patent is extended or adjusted under 35 U.S.C. 154(b) by 0 days.

(21) Appl. No.: 18/353,630

(22) Filed: Jul. 17, 2023

(65) Prior Publication Data

US 2023/0356477 A1  Nov. 9, 2023

Related U.S. Application Data (62) Division of application No. 17/094,413, filed on Nov. 10, 2020, now Pat. No. 11,760,037.

(51) Int. Cl.
*B29C 65/00* (2006.01)
*B29C 65/08* (2006.01)

(52) U.S. Cl.
CPC ........ *B29C 66/92611* (2013.01); *B29C 65/08* (2013.01); *B29C 66/8324* (2013.01); *B29C 66/92211* (2013.01); *B29C 66/9512* (2013.01)

(58) Field of Classification Search
CPC . B29C 65/08; B29C 66/9512; B29C 66/8324; B29C 66/92211; B29C 66/92615; B29C 66/92611; B29C 66/9221; B65B 13/02; B65B 13/325; B65B 13/22
See application file for complete search history.

(56) References Cited

U.S. PATENT DOCUMENTS

2009/0188966 A1* 7/2009 Klinstein .............. B29C 66/961
228/1.1

* cited by examiner

*Primary Examiner* — George R Koch
(74) *Attorney, Agent, or Firm* — Greenberg Traurig, LLP (57) ABSTRACT

A feedback control system for use with ultrasonic welding. A weld energy set point and/or a reference power curve are used by a controller to provide a power supply voltage set point and a power supply frequency set point for the power that is to be drawn by an ultrasonic weld generator. Information regarding the actual voltage and/or frequency of the drawn electrical power, and/or the frequency and magnitude of an ultrasonic wave transmitted from the generator to an applicator tool used to weld an object can be utilized by an estimator to estimate the weld energy dissipated at the weld site and/or generate a power curve for the welding operation. Using information from the estimator, the controller can determine adjustments for variables for the current and/or future welding operations. Further, welding may not commence until a clamping force exerted on the object satisfies a clamping force set point.

17 Claims, 6 Drawing Sheets

AUTOMATED ULTRASONIC WELDING OF CABLE TIES

CROSS-REFERENCE TO RELATED APPLICATIONS

This application is a divisional of U.S. patent application Ser. No. 17/094,413, filed on Nov. 10, 2020, now U.S. Pat. No. 11,760,037 B2; which is herein incorporated by reference in its entirety.

FIELD OF INVENTION

The present application relates to automated ultrasonic welding of cable ties, and more particularly, to automated ultrasonic welding operations of cable ties that employ feedback control.

BACKGROUND

Cable ties often include mechanical locking features that can secure, or fasten, the cable tie in a closed position. Such cable ties often include, at or around an end of the cable tie, a housing that is configured to receive insertion of the other, or tail, end of the cable tie. The tail end, among other portions, of the cable tie can include serrations that can lockingly engage a pawl that is housed within the housing. Thus, as the tail end is inserted into, and/or pulled through the housing, the engagement between the pawl and serrations on the cable tie can lockingly secure the cable tie in the closed position about an object, such as, for example, a cable bundle. Yet, the configuration of the housing, which can be larger than other adjacent portions of the cable tie, can create a protrusion that can rub against, and thus deteriorate, the adjacent insulation of a cable(s) in the cable bundle, thereby compromising the integrity of the insulation. Additionally, the excess portion of the cable tie at the tail end that is pulled through, and extends out of, the housing can often constitute waste.

Attempts at foregoing the use of such mechanical fasteners have included using cable ties that are secured in a closed position about an object, including cable bundles, via ultrasonic welding. Yet, use of ultrasonic welding is often hindered by a lack of repeatable weld quality, including, for example, repeatability with respect to consistent loop tensile strength, tension around the cable bundle, and/or visual appearance. Moreover, the ability to attain repeatable weld quality can, for at least certain cable ties, be a requirement for particular marketplace and/or regulatory requirements, including, for example, Underwriters Laboratory (UL) and International Electrochemical Commission (IEC) standard 62275, among other standards.

Accordingly, although various manners of fastening cable ties are currently available in the marketplace, further improvements are possible to provide a means for automated ultrasonic welding of cable ties.

BRIEF SUMMARY

An aspect of an embodiment of the present application is a method that can include determining if a clamping force being exerted by a tip of a weld horn of an applicator tool on an object that is to be ultrasonically welded satisfies a clamping force set point. The method can also include attaining a weld energy set point for the ultrasonic welding of the object, the weld energy set point corresponding to an accumulated energy that is to be dissipated at a weld site of the ultrasonic weld. Further, after satisfaction of the clamping force set point, ultrasonic welding of the object can commence, during which an ultrasonic weld generator can provide an ultrasonic wave to the applicator tool for the ultrasonic welding of the object. The method can also include estimating the weld energy that is/was delivered to the weld site, and the ultrasonic welding of the object can cease after the estimated weld energy satisfies the weld energy set point.

Another aspect of an embodiment of the present application is a method that can include determining if a clamping force being exerted by a tip of a weld horn of an applicator tool on an object that is to be ultrasonically welded satisfies a clamping force set point. Further, a reference power curve for ultrasonic welding of the object can be attained that can correspond to an amount of power that is to be drawn by an ultrasonic weld generator as a function of time during an ultrasonic welding operation to attain a predetermined weld energy set point, the predetermined weld energy set point corresponding to an accumulated energy that is to be dissipated at a weld site of the ultrasonic weld. The method can also include commencing, after satisfaction of the clamping force set point, and using power information from the reference power curve, the ultrasonic welding operation to weld together layers of the object. Further, a shape of a power curve that is generated during the ultrasonic welding operating can be monitored in relation to a shape of the reference power curve, and, based at least on an evaluation of the shape of the generated power curve with respect to the shape of the reference power curve, a determination can be made to cease the ultrasonic welding operation.

Additionally, an aspect of an embodiment of the present application is a feedback control system for welding an object, the feedback control system including an ultrasonic weld generator and an applicator tool. The applicator tool can be adapted to receive an ultrasonic wave generated by the ultrasonic weld generator to ultrasonically weld a portion of the object, and can include a weld horn and at least one pivotal arm. The at least one pivotal arm can have an anvil segment and be selectively displaceable to position at which at least the portion of the object is located between the anvil segment and a tip of the weld horn. Additionally, the weld horn can be displaceable to selectively, and adjustably, exert a clamping force against the portion of the object. The system can further include a controller that can be adapted to, using at least one of a weld energy set point and a reference power curve, generate a signal indicating a voltage set point and a frequency set point for an electrical power that is to be drawn by the ultrasonic welding generator. A sensor of the system can be adapted to measure the clamping force being exerted against the portion of the object, and the controller can be further adapted to determine (a) if the clamping force measured by the sensor satisfies a clamping force set point, (b) generate, if the clamping force does not satisfy the clamping force set point, a signal that adjusts a position of at least the weld horn relative to the object so as to adjust the clamping force being exerted against the portion of the object, and (c) delay commencement of the object being ultrasonically welded until the clamping force exerted against the portion of the object satisfies the clamping force set point. The system can further include an estimator that can be coupled to the ultrasonic weld generator and the controller. The estimator can be adapted to estimate at least one of the following: (a) a weld energy dissipated to a weld site at which the portion of the object is being ultrasonically welded, and (b) a shape of a power curve corresponding to an electrical power drawn by the ultrasonic weld generator during the ultrasonic welding of the portion of the object. Additionally, the controller can be further adapted to determine, based on at least one of the weld energy or the power curve estimated by the estimator, whether the ultrasonic welding of the portion of the object is completed.

These and other aspects of the present invention will be better understood in view of the drawings and following detailed description.

BRIEF DESCRIPTION OF THE DRAWINGS

The description herein makes reference to the accompanying figures wherein like reference numerals refer to like parts throughout the several views.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 1:
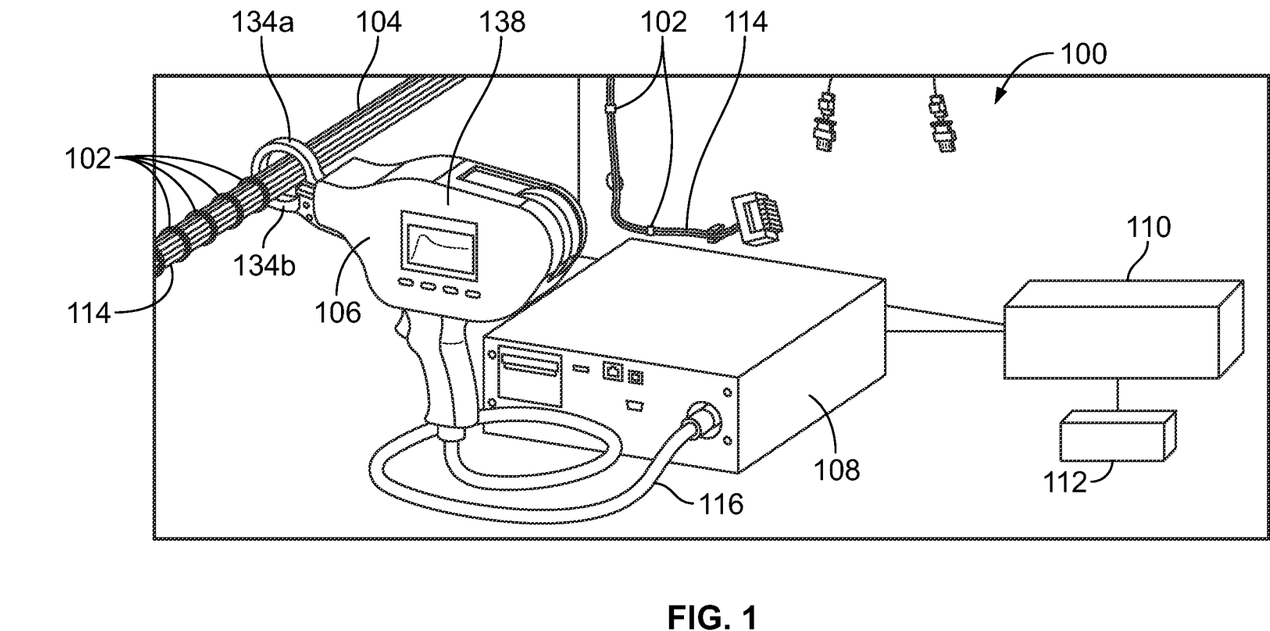
FIG. 1 illustrates an exemplary ultrasonic welding system for fastening a cable tie to a cable bundle according to an illustrated embodiment of the subject application.

FIG. 1 illustrates an exemplary ultrasonic welding system 100 for fastening a cable tie 102 to a cable bundle 104 according to an illustrated embodiment of the subject application. As shown, the ultrasonic welding system 100 can include an applicator tool 106, ultrasonic welding generator 108, control system 110, and input/output device 112. According to the illustrated example, the applicator tool 106 is used to fasten or secure one or more cable ties 102 in a closed position around a cable bundle 104, which can, for example, be used in connection with producing a wire harness 114.

The applicator tool 106 can be electrically coupled to the ultrasonic welding generator 108, such as, for example, via a cable 116. Further, the ultrasonic welding generator 108 can be configured to convert electrical power provided to the ultrasonic welding generator 108, such as, for example, low-frequency electricity (e.g. around 50 to around 60 Hertz (Hz)), to high-frequency electricity, such as, for example, electricity having a frequency of around 20 to around 40 kilohertz (kHz). The high-frequency electricity can be delivered via the cable 116 from the ultrasonic welding generator 108 to the applicator tool 106 for use in ultrasonic welding procedures, such as, for example, by the applicator tool 106 in connection with the welding of cable tie material of a cable tie 102. The ultrasonic welding generator 108 can also be communicatively coupled to the applicator tool 106 such that information regarding the welding procedure(s), including, for example, welding settings, parameters, and sensed or measured data or information can be communicated between at least the ultrasonic welding generator 108 and the applicator tool 106.

Figure 2:
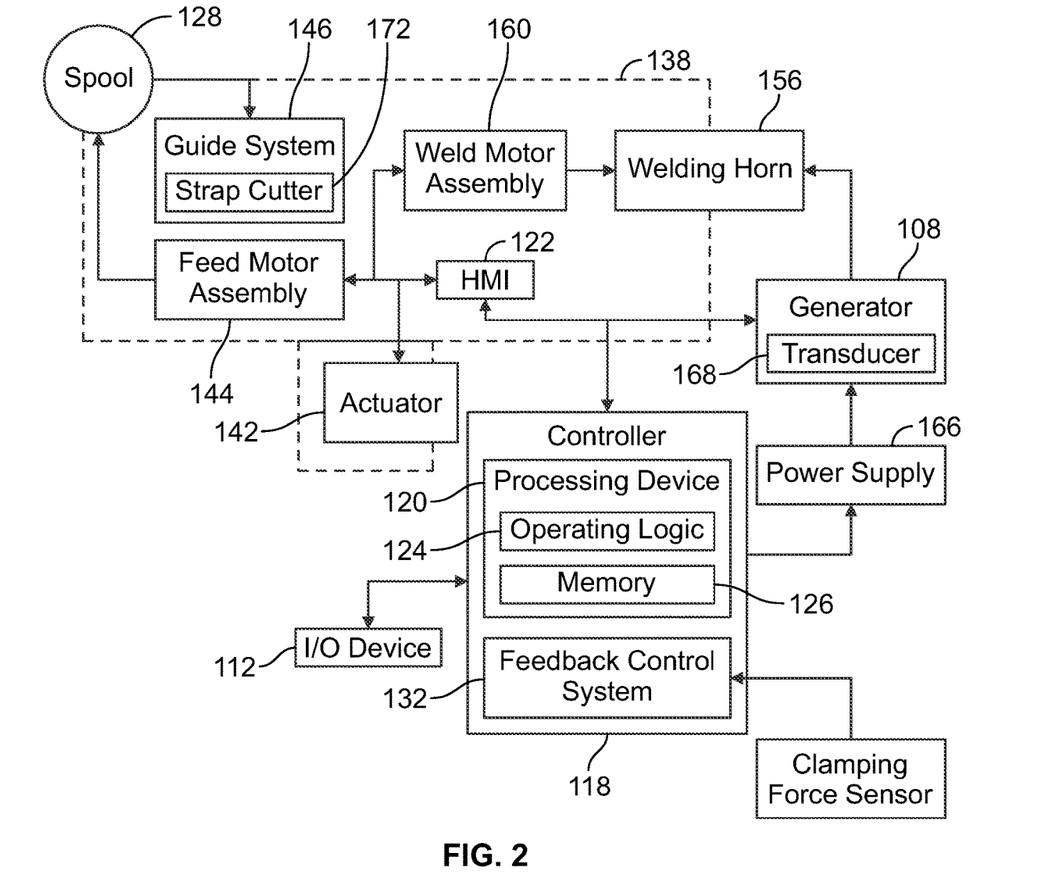
FIG. 2 illustrates a representation of at least a portion of an exemplary ultrasonic welding system according to an illustrated embodiment of the subject application.

As seen in FIGS. 1 and 2, the ultrasonic welding generator 108 and/or applicator tool 106 can also be communicatively coupled to the control system 110, such as, for example, via a wired or wireless connection(s). As seen in FIG. 2, the control system 110 can include a controller 118 having a processing device 120, and be communicatively coupled to the one or more input/output (I/O) devices 112, such as, for example, a keyboard, keypad, display, and/or monitor, as well as a combination thereof, among other input/output devices. Additionally, the processing device 120 can also be communicatively coupled to a human-machine interface (HMI) 122 of the applicator tool 106. A variety of different types of processing devices can be used for the processing device 120, such as, for example, a programmable, dedicated, and/or hardwired state machine, or any combination thereof. The processing device 120 of the control system 110 can further include multiple processors, such as, for example, Arithmetic-Logic Units (ALUs), Central Processing Units (CPUs), Digital Signal Processors (DSPs), or the like. Processing devices 120 with multiple processing units may also utilize distributed, pipelined, and/or parallel processing. The processing device 120 may also be dedicated to performance of just the operations described herein, or can be utilized in one or more additional applications.

In the depicted form, the processing device 120 is of a programmable variety that executes algorithms and processes data in accordance with operating logic 124 as defined by programming instructions (such as software or firmware) stored in a memory 126 of the control system 110. Alternatively, or additionally, the operating logic 124 is at least partially defined by hardwired logic or other hardware. The processing device 120 can include one or more components of any type suitable to process the signals received from an input/output device 112, such as, for, and to provide desired output signals, such as, for example, signals that can provide graphical, numerical, and/or alpha representations, among others, on a display of the control system 110. Such components may include digital circuitry, analog circuitry, or a combination of both.

According to certain embodiments, the memory 126 can be attachable to a cartridge or spool 128 containing the cable tie material 130 that will, when ultrasonically welded and trimmed from other cable tie material 130 of the spool 128, form the cable tie 102. Thus, for example, the memory 126 can, according to certain embodiments, comprise an electrically erasable programmable read-only memory (EEPROM) that may contain information that is specific to the particular cable tie material 130 and the configuration of the cable tie material 130 that is contained within that cartridge and/or spool 128, including, for example, information regarding a weld energy set point (*Qt) and associated look-up tables and/or power curve profiles, among other information, as discussed below. Alternatively, as shown in FIG. 2, according to other embodiments, the memory 126 can be included with the processing device 120 and/or coupled to the processing device 120. Further, the memory 126 can be of one or more other types, such as a solid-state variety, electromagnetic variety, optical variety, or a combination thereof. Additionally, the memory 126 can be volatile, nonvolatile, or a combination thereof, and some or all of the memory 126 can be of a portable variety, such as a disk, tape, memory stick, cartridge, or the like. In addition, according to certain embodiments, the memory 126 can store data that is manipulated by the operating logic 124 of processing device 120, such as data representative of signals received from and/or sent to the applicator tool 106, ultrasonic welding generator 108, and/or the input/output device (s) 112, in addition to, or in lieu of, storing programming instructions defining the operating logic 124.

The controller 118 can control operation of at least portions of the applicator tool 106 and/or the ultrasonic welding generator 108, including, for example, information and menus displayed on the HMI 122 on the applicator tool 106. Additionally, according to certain embodiments, the controller 118 can be configured to control at least certain operations of the applicator tool 106 and/or ultrasonic welding generator 108 based at least on various parameters and/or settings, which may be predetermined and/or detected or measured, including, for example, real-time information or data that is measured or detected during an ultrasonic welding operation and/or attained and recorded or stored from a prior ultrasonic welding operation, as discussed below. The particular parameters and settings controlled by controller 118 can be based on a variety of criteria, and may or may not utilize preprogrammed and/or predetermined parameters that may be stored in the memory 126 and/or obtained or adjusted by a feedback control system 132, as discussed below.

Figure 3A:
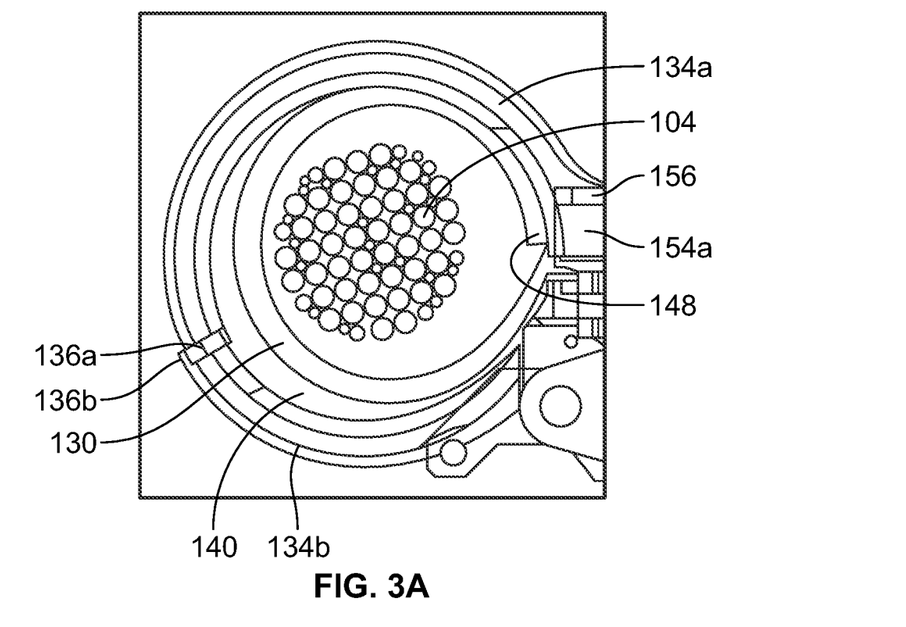
FIG. 3A illustrates an enlarged view of a portion of a cable bundle positioned within an aperture between jaws of an applicator tool as cable tie material is being wound around the cable bundle.
Figure 3B:
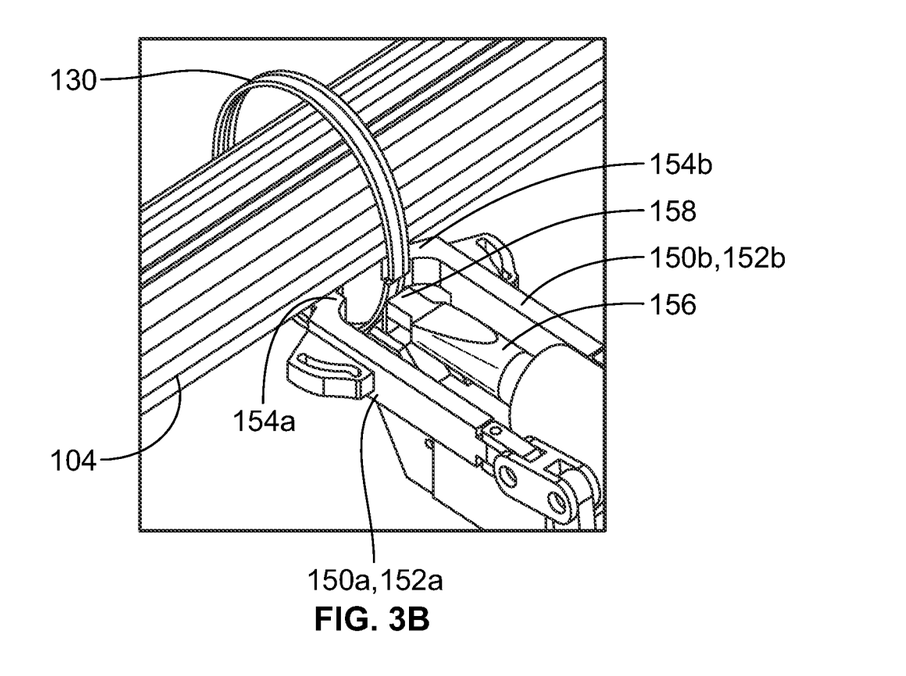
FIG. 3B illustrates an enlarged portion of an applicator tool as cable tie material is being wound around the cable bundle.
Figure 4A:
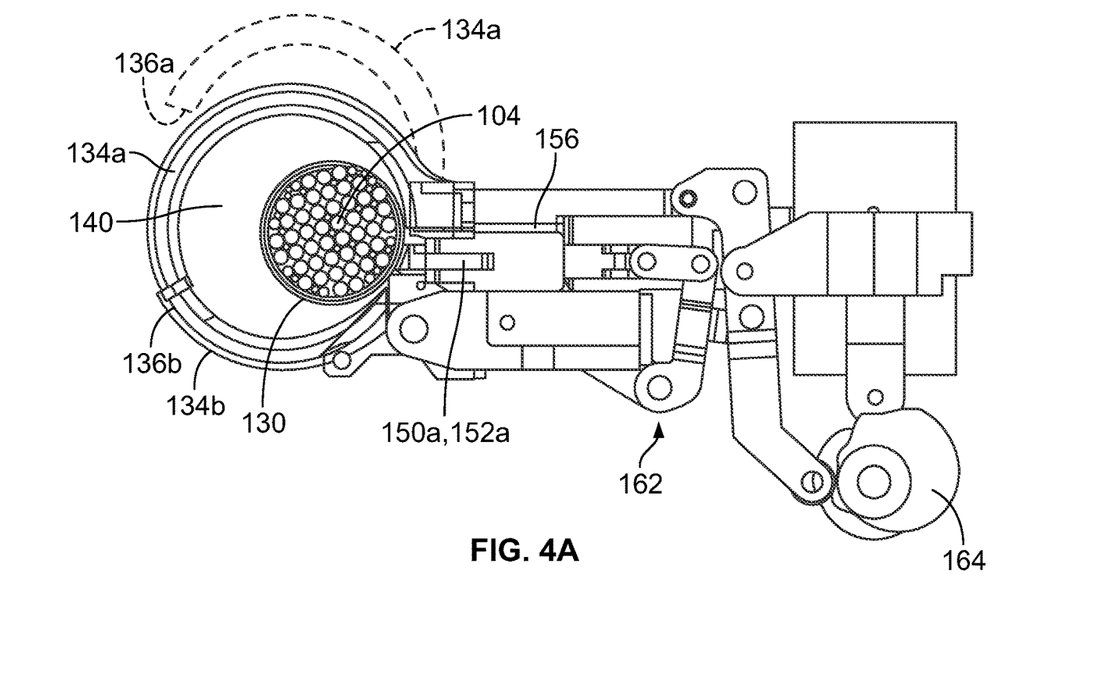
FIGS. 4A and 4B illustrate side views of portions of an applicator tool positioned to ultrasonically weld a cable tie fastener in a fastened position about a cable bundle.

As shown in at least FIGS. 1 and, 3A-4B, the applicator tool 106 can include a first jaw 134a and a second jaw 134b that extend outwardly from a housing 138 of the applicator tool 106. At least one of the first and second jaws 134a, 134b, such as, for example, the first, upper jaw 134a, can be pivotally displaceable relative to the other jaw 134b from a closed position, as seen in FIGS. 1, 3A and 4A, to an open position, as indicated by the broken lines in FIG. 4A. When at the closed positon, a distal end 136a of the first jaw 134a can be in relatively close proximity to, if not abutting and/or overlapping, a distal end 136b of the second jaw 134b, thereby at least generally closing an aperture 140 that is generally defined by the first and second jaws 134a, 134b. As seen in at least FIGS. 1 and 3A, 4A, the aperture 140 can have a size, such as, for example, a diameter, that can accommodate at least selective placement of at least a portion of one or more cable bundles 104 within the aperture 140.

When the first jaw 134a is in the open position, as indicated by the broken lines shown in FIG. 4A, the distal end 136a of the first jaw 134a can be separated from the second jaw 134b by a distance that is sized to accommodate the ingress/egress of the cable bundle(s) 104 into/from the aperture 140, and thus accommodate the applicator tool 106 being selectively, and removably, positioned around the cable bundle 104. Accordingly, when the cable bundle 104 is positioned within the aperture 140, the first jaw 134a can be pivotally displaced from the open position to the closed position, and operations relating to fastening a cable tie 102 around the portion of the cable bundle(s) 104 within the aperture 140 can commence. Following the cable tie 102 being formed and secured to, and/or around, the cable bundle(s) 104, the first jaw 134a can again be displaced from the closed position to the open position such that the cable bundle 104 can be removed from the aperture 140 through the space between the distal ends 136a, 136b of the opposing first and second jaws 134a, 134b.

As seen in at least FIG. 2, the housing 138 of the applicator tool 106 can house a variety of components of the applicator tool 106. For example, according to certain embodiments, the housing 138 can at least partially, if not completely, house an actuator 142, such as, for example, a manual trigger that can be engaged by a worker. Alternatively, the actuator 142 can be an automated actuator that is operated upon receipt of an on signal, and/or deactivated upon receipt of an off signal, from the control system 110 and/or ultrasonic welding generator 108.

Activation of the actuator 142 can facilitate the operation of a feed motor assembly 144 of the applicator tool 106. According to the illustrated embodiment, the feed motor assembly 144 can include a motor, such as, for example, an electric motor, that can facilitate the rotation, in a first direction, of a spool 128 containing cable tie material 130 for the cable tie 102. According to certain embodiments, the spool 128 can contain a generally continuous strand of cable tie material 130 for the cable tie 102, such as, for example, polyoxymethylene (POM), including acetal and/or polyacetal, or high-density polyethylene (HDPE), among other non-metallic or metallic cable tie materials 130. Alternatively, the spool 128 can contain a plurality of detachable cable ties formed from similar metallic or non-metallic cable tie materials. The cable tie material 130 dispensed via rotation of the spool 128 by activation of the feed motor assembly 144 can be led by a guidance system 146 through the applicator tool 106, and moreover, through and/or around the housing 138, and be fed around, or in proximity to, inner surfaces the first or second jaw 134a, 134b. The guidance system 146 can comprise one or more guides, pulleys, rollers, and/or other devices or structures that can at least assist in directing or guiding the passage, and/or supplement the driving movement, of the cable tie material 130 that is being unwound from the spool 128 and being delivered to at least the jaws 134a, 134b and/or aperture 140 of the applicator tool 106.

As seen in at least FIG. 3A, according to the illustrated embodiment, the cable tie material 130 fed from the spool 128 can slide and/or be guided along inner surfaces of the jaws 134a, 134b that are generally adjacent to the aperture 140 so as to form one or more loops around the cable bundle 104. Moreover, according to certain embodiments, the stiffness of the cable tie material dispensed from the spool 128 can assist with the cable tie material 130 being able to move, as well as be retained, along or generally adjacent to at least a portion of the inner surfaces of the first and second jaws 134a, 134b as the cable tie material 130 is being looped around an adjacent portion of the cable bundle(s) 104 that is/are within the aperture 140 formed generally between the first and second jaws 134a, 134b. For example, according to certain embodiments, a leading end 148 of the cable tie material 130 can pass through the guidance system 146 and along the inner surfaces of the first and second jaws 134a, 134b with other subsequent portions of the continuous strand of cable tie material 130 following. As seen, as the leading end 148 completes a loop around the adjacent portion of the cable bundle 104, another, downstream portion of the strand of the cable tie material 130 can be positioned to overlap the leading end 148 of the strand of cable tie material 130, thereby providing one loop of cable tie material 130 for subsequent forming and fastening of a cable tie 102 around the cable bundle 104. Additional loops of cable tie material 130 can continue to be formed, if desired, around the cable bundle 104 for the cable tie 102 by continuing to wrap more cable tie material 130 around the cable bundle 104 while the leading end 148 of the cable tie material 130 continues to be displaced around the cable bundle 104.

Figure 4B:
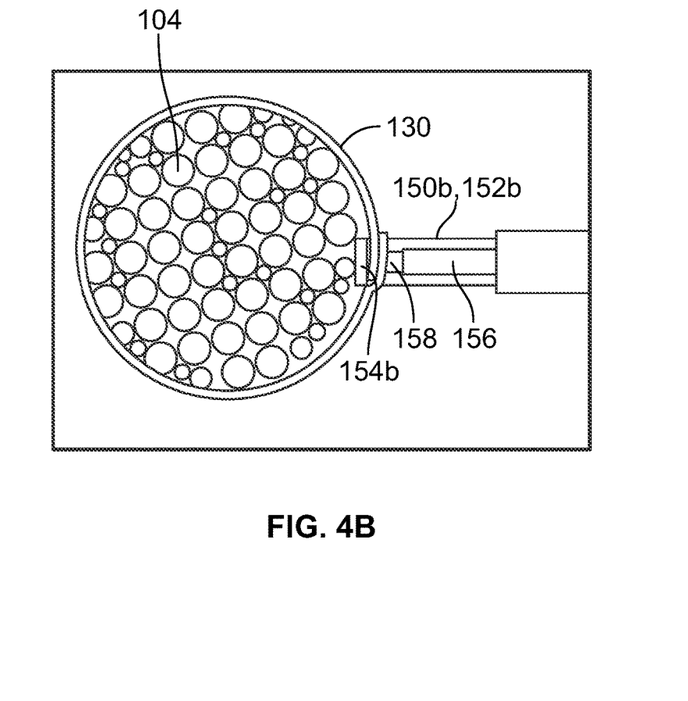

When the desired number of loops of cable tie material 130 for a cable tie 102 are positioned around the cable bundle 104, the applicator tool 106 can provide a clamping force against adjacent portions of the cable tie material 130, as seen for example in FIGS. 4A and 4B. For example, as seen in at least FIG. 3B, the applicator tool 106 can include opposing pivotal arms 150a, 150b, each pivotal arm 150a, 150b having an arm segment 152a, 152b that extends in a first direct generally toward the cable bundle 104 and/or aperture 140, and an anvil segment 154a, 154b that is attached to a distal end of the associated arm segment 150a, 150b, and which extends in a second direction that is generally orthogonal to the first direction of the associated arm segment 150a, 150b. The pivotal arms 150a, 150b can be pivotal from a first, open position at which the associated anvil segments 154a, 154b are generally positioned away from the cable tie material 130, as shown in FIG. 3B, to a second, closed position at which at least a portion of the anvil segments 154a, 154b are positioned between the cable tie material 130 and the adjacent portion of the cable bundle 104.

With the anvil segments 154a, 154b positioned between the cable tie material 130 and the adjacent portion of the cable bundle 104, a weld horn 156 of the applicator tool 106 can be axially displaced in the direction of the anvil segments 154a, 154b such that overlapping portions of the cable tie material 130 are positioned between the anvil segments 154a, 154b and a tip 158 of the weld horn 156, as indicated, for example in at least FIG. 4B. According to certain embodiments, such axial displacement of the weld horn 156 can be facilitated by automated rotation of a cam 164 via operation of a motor or other drive unit of a weld motor assembly 160 (FIG. 2) of the applicator tool 106. For example, according to certain embodiments, the weld horn 156 is coupled to a motor of the weld motor assembly via the cam 164 and a linkage system 162 comprising one or more connecting links, as seen for example in FIG. 4A. The positioning of the anvil segments 154a, 154b and the tip 158 of the weld horn 156 relative to the adjacent portion of the cable tie material 130 can provide a clamping, or pinching, force against the cable tie material 130 that is positioned therebetween. As discussed below, the clamping force, which may be in a direction that is normal to the cable tie material 130 that is positioned between the tip 158 and the anvil segments 154a, 154b, that is attained via the controlled operation of the cam 164 can be determined and evaluated by a feedback control system 132, and the cam 164 may, if needed, be subsequently operated, based on the results of the evaluation and prior to the welding of the cable tie material 130, to either further increase or decrease the clamping force that is being exerted against the cable tie material 130.

Such clamping force that is being exerted against portions of the cable tie material 130 can, according to certain embodiments, at least provide a degree of resistance against the cable tie material 130 that can at least assist in the removal of slack or excess cable tie material 130 that is wrapped about the cable bundle 104, and moreover assist in tightening the cable tie material 130 about the cable bundle 104. More specifically, as the tip 158 of the weld horn 156 and the anvil segments 154a, 154b provide a clamping force against cable tie material, the motor of the feed motor assembly 144 can be operated to rotate the spool 128 in a second, opposite direction that that can cause at least a portion of the cable tie material 130 to be generally be pulled back in the direction of, and/or rewound about, spool 128, thereby tightening, or tensioning, the cable tie material 130 about the cable bundle 104. Additionally, in an effort to minimize waste, a portion of the leading end 148 of the cable tie material 130 can be amongst, or adjacent to, the portion of the cable tie material 130 that is positioned between the anvil segments 154a, 154b and the tip 158 of the weld horn 156. Further, as discussed below, as such clamping force can impact the quality of the weld formed during the ultrasonic welding operation, the degree of clamping force or pressure exerted against the cable tie material 130 can be evaluated by a feedback control system 132 (FIG. 5), including with respect to a predetermined clamp force set point or threshold, in connection with at least determining, for example, whether to commence the welding procedure or adjust the position of the tip 158 and/or weld horn 156 so as to adjust the clamping force before commencing the welding procedure.

Figure 5:
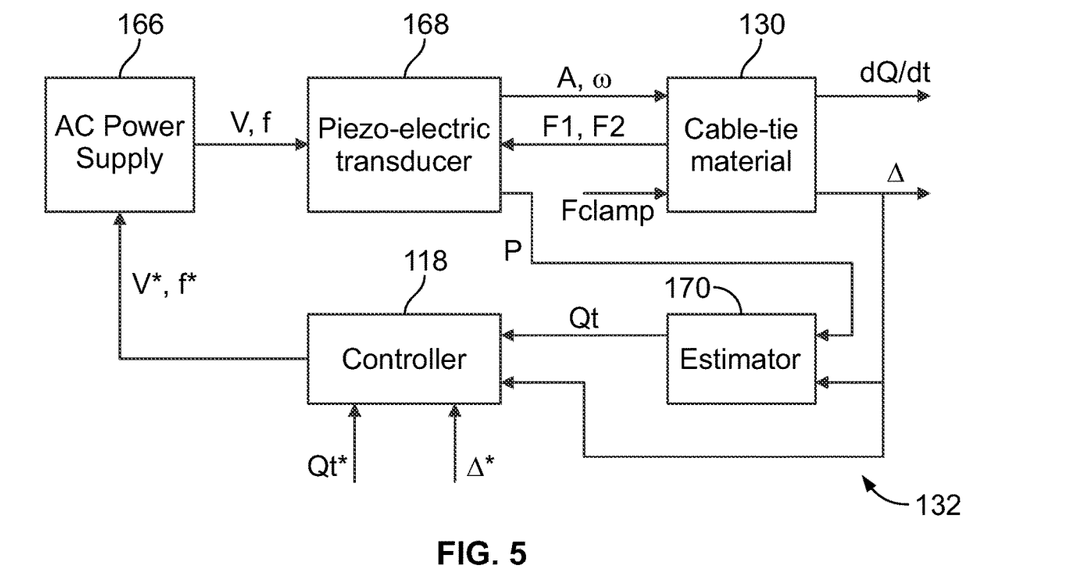
FIG. 5 illustrates a feedback control system for an ultrasonic welding system according to an illustrated embodiment of the subject application.

FIG. 5 illustrates a feedback control system 132 for the ultrasonic welding system 100 according to an illustrated embodiment of the subject application. As discussed below, the feedback control system 132 can provide closed loop digital feedback that can be utilized to achieve repeatable weld quality. As indicated by FIG. 2, according to certain embodiments, at least certain operations of various components of the system 100 in response to information provided by and/or determined through use of the feedback control system 130 can be controlled by the controller 118.

As seen in FIG. 5, according to the illustrated embodiment, the feedback control system 132 can be used to determine, at least before a welding operation commences, and based on information from a digital feedback signal, whether the clamping force (Fclamp) that is being exerted against the cable tie material 130 satisfies a clamping force set point, and if not, facilitate adjustments to at least the applicator tool 106 so that the clamping force set point is satisfied. The clamping force set point can be determined based on a variety of different information, including, for example, the material composition of the cable tie material 130, and/or the size, shape, and/or configuration of the cable tie material 130, among other considerations. For example, according to certain embodiments, the clamping force set point can, for the particular cable tie material 130 that is being welded, comprise a range of clamping forces that provide sufficient clamping, and associated pressure, to attain desired weld qualities or characteristics without overly deforming and/or damaging the cable tie material 130.

According to certain embodiments, information regarding the clamping force set point can be determined or obtained by the controller 118, such as, for example, from the memory 126 or a database, including, but not limited to, a cloud based database. Additionally, the controller 118 can determine, using the clamping force set point, a displacement set point ($\Delta^*$) for the displacement of one or more components of the applicator tool 106 to attain a clamping force (Fclamp) that satisfies the clamping force set point. Such a determination(s) can include determining a degree of displacement one or more of the weld horn 156 and/or the tip 158 of the weld horn 156, which can be linear displacements, and/or a rotational displacement of the cam 164 are to be displaced. Moreover, the displacement set point ($\Delta^*$) can correspond to the extent one or more of such components are to be displaced to attain and/or adjust the degree of clamping force (Fclamp) being exerted by at least the tip 158 of the weld horn 156 against the cable tie material 130 so that a particular clamping force set point is attained. For example, according to certain embodiments, the determined displacement set point ($\Delta^*$) can be correlated to a displacement of the cam 164, including, for example, a displacement relating to angular position, degree of rotation, and/or a number of rotations of the cam 164 attained via operation of the weld motor assembly 160, that will correspond to the clamping force (Fclamp) being exerted against the cable tie material 130 being estimated to satisfy the clamping force set point.

The actual or estimated displacement ($\Delta$) that is attained, such as, for example, the distance the weld horn 156, tip 158, and/or cam 164 has been displaced can be evaluated by the controller 118 in connection with determining whether the displacement set point ($\Delta^*$) has been satisfied. According embodiments, such a determination can include determining whether the estimated displacement ($\Delta$) is within a predetermined range of the displacement set point ($\Delta^*$). According to certain embodiments, the distance of such actual displacement can be estimated or measured, such as, for example, via use of a sensor. Additionally, according to certain embodiments, the determination of the degree of displacement ($\Delta$) can also consider the current position of the tip 158, weld horn 156, and/or cam 164, which can also be estimated or measured.

If such an evaluation or comparison of the actual or estimated displacement ($\Delta$) and displacement set point ($\Delta^*$) results in a determination that the displacement set point ($\Delta^*$) has not been satisfied, then the cam 164 can again be operated in an attempt to attain the displacement set point ($\Delta^*$). The updated actual or estimated displacement ($\Delta$) can subsequently be evaluated in connection with determining whether the displacement set point ($\Delta^*$) has been satisfied. This process can continue to be repeated at least until the displacement set point ($\Delta^*$) is satisfied.

Additionally, in connection with, or following, determining whether the displacement set point ($\Delta^*$) has been satisfied, the controller 118 can also evaluate whether the resulting clamping force (Fclamp) that is being exerted against the cable tie material 130 satisfies a clamping force set point. As discussed above, according to certain embodiments, the exerted clamping force (Fclamp) can be measured, such as, for example, using a strain gauge or piezoelectric transducer, to attain a measured, predicted, or estimated clamping force value (collectively referred to as a clamping force value). Additionally, FIG. 5 illustrates an embodiment in which the piezoelectric transducer 168 that receives a power supply voltage from a power supply 166 for welding, as discussed below, also, when not being used for welding, acting as a sensing unit in connection with attaining information or a measurement(s) of the clamping force values (F1, F2) indicating the level or degree of the clamping force (Fclamp) that is being exerted against the cable tie material 130. However, alternatively, according to other embodiments another, or different piezoelectric transducer or sensor can be used for measuring or determining the clamping force value(s) (F1, F2).

Information regarding a first clamping force value (F1) can initially be evaluated to determine whether the clamping force set point is satisfied. Such an evaluation can, according to certain embodiments, occur after the displacement set point ($\Delta^*$) has been determined to be satisfied. If such an evaluation, which can comprise a comparison of the clamping force value (F1) to the clamping force set point, indicates the exerted clamping force (Fclamp) is to be increased or decreased, the controller 118 can determine a degree for displacement of the tip 158, weld horn 156, and/or cam 164, and subsequently transmit a signal to facilitate rotational displacement of the cam 164 so as to obtain this determined degree of displacement. Such a determination can, according to certain embodiments, also include changing or modifying the displacement set point ($\Delta^*$) that is recorded in the memory 126 or database for use in future welding operations. In such an event, following operation of the cam 164, an updated, or second, clamping force value (F2) can be attained in a manner similar to that described above with respect to attaining the initial clamping force value (F1). The updated the clamping force value (F2) can then be evaluated, or compared, with respect to the clamping force set point, and a determination can be made as to whether the clamping force set point is satisfied. If the clamping force set point is not satisfied, the process of adjusting the location of the tip 158, and thus the degree of clamping force being exerted against the cable tie material 130, can continue until the clamping force set point is satisfied. Additionally, further updates, modifications, and/or refinement of the displacement set point ($\Delta^*$), as determined while seeking to satisfy, or which is associated with the satisfaction of, the clamping force set point can also be stored in the memory 126 or a database for use during subsequent or future welding operations. According to certain embodiments, upon at least satisfaction of the clamping force set point, the welding process can commence, as indicated by the change in thermal energy with respect to time (dQ/dt) shown in FIG. 5.

During the welding procedure, changes in the state of ultrasonic weld, such as, for example, changes relating to the melting of energy directors and/or the fusion of cable tie layers, can change the electrical response of a transducer 168 of the ultrasonic welding generator 108. Such changes in the electrical response of the transducer 168 can include, for example, changes in the power, voltage, and/or current draw of the transducer 168, the resonant frequency, and/or the mechanical impedance of the layers of the cable tie material 130 that are wrapped about the cable bundle 104. Thus, as discussed below, rather than basing the ultrasonic welding operation on the duration of time during which the cable tie material 130 is being ultrasonically welded, the feedback control system 132 can be configured to monitor and control the welding operation based on the accumulated ultrasonic energy that is dissipated, such as, for example, dissipated to the weld joint, and/or the shape of a power curve that is being attained during the welding operation.

Thus, according to certain embodiments, the feedback control system 132 can be configured to associate the welding operation that is to commence with a weld energy set point (Qt*), which may be for example, be the total or accumulated weld energy that is to be absorbed by the weld joint, as measured, for example, in Joules (J). Alternatively, or additionally, the feedback control system 132 can be configured to monitor the power curve that is being attained during the welding operation, and moreover control the power wave by reference to welding power curves that are known to be related to producing welds that provide the resulting cable tie 102 with particular characteristics, such as, for example, provide a particular range of loop tensile strength, tension around the cable bundle, and/or visual appearance, among other characteristics.

Figure 7:
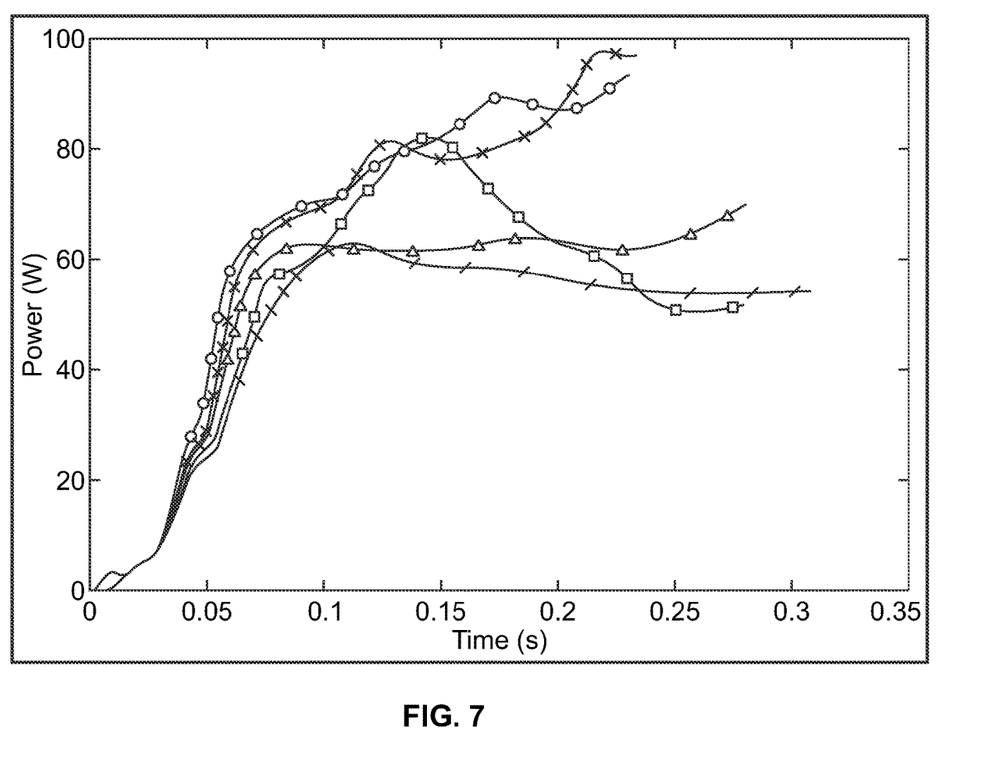
FIG. 7 provides an exemplary chart depicting five power curves for polyacetal cable ties with an energy set point of 15 Joules (J).

For example, FIG. 7 illustrates five exemplary known power curve profiles for cable tie material 130 comprising polyacetal, with the areas under each of the power curves corresponding to a weld energy set point (Qt*) that has been set for 15 Joules (J). The selection of a particular weld energy set point, or range of weld energy set points, can, according to certain embodiments, be based on an evaluation of the characteristics, such as, for example, mechanical and/or visual properties, that are attained when using a variety of different energy set points, or ranges of energy set points, for a particular composition and/or configuration of a cable tie material 130. Further, power curve profiles can be updated or modified during and/or after welding operations to reflect changes that correspond to attaining a weld that provides certain mechanical and/or visual properties. Moreover, such updating or modifications can reflect changes or machine learning that can further refine and improve the information provided by the power curves, and thus improve the quality of the corresponding ultrasonic weld. As seen in FIG. 7, according to certain embodiments, the power curves can provide an indication of the electrical power, such as, for example, in Watts, that is to be delivered to the transducer 168 and/or drawn from the power supply 166 as a function of time (seconds). The illustrated fluctuations in the power curves can be based, at least in part, on the impact the softening and/or melting of the cable tie material 130 during the welding operation has on the power drawn from the ultrasonic welding generator 108 and/or the power drawn by the transducer 168.

Additionally, variables that can impact attaining the weld energy set point (Qt*) and/or a particular power curve profile can include, but are not limited to, one or more of at least the following: 1) variables associated with the ultrasonic welding generator 108, such as, for example, amplitude, frequency, voltage, current, and/or weld time; (2) variables associated with the cable tie material 130, including, for example, elasticity, strength, elongation at break, thermal condition, and/or heat cap; (3) the characteristics and/or settings of the applicator tool 106, including, for example, cam position, cable tie displacement, motor current, weld force, and hold time; and/or (4) the geometry of the cable tie material 130, including, for example, the cross sectional width, height, and/or energy direction height. Some of these foregoing variables can be time dependent, while other variables are not time dependent. Additionally, some of these variables, including, for example, at least some of the above-identified variables associated with the ultrasonic welding generator 108 and applicator tool 106, can be varied by, or based on, command signals from the controller 118 such that the power drawn during the course of the welding operation by the transducer 168 can at least assist in attaining the weld energy set point (Qt*) and/or a particular power curve profile. Additionally, in view of the foregoing, different cable tie material 130 compositions and/or configurations, and/or different ultrasonic welding generators 108, can utilize different weld energy set points (Qt*) and/or different clamping force set points.

Information regarding the weld energy set point (Qt*), power curve, and/or the associated clamping force set point for a particular welding operation(s) can be attained in a variety of different manners, including, for example, automatically inputted, sensed, or retrieved, or otherwise manually inputted by an operator, such as, for example, via the input/output device 112 and/or the HMI 122. For example, as discussed above, according to certain embodiments, the spool 128 can be a cartridge that includes a memory 126 that may contain information relating to the weld energy set point (Qt*), power curve, and/or the associated clamping force set point for the particular cable tie material 130, among other information, that is contained within the cartridge. Alternatively, according to certain embodiments, upon detection, recognition, or manual input of information regarding the cable tie material 130, information relating to the weld energy set point (Qt*), power curve, and/or the associated clamping force set point, among other information, may be attained by the controller 118, such as, for example, a memory 168 of, or which is accessible by, the controller 118, and/or from a database, including, but not limited to, a cloud based database. Further, information regarding the weld energy set point (Qt*), power curve, and/or the associated clamping force set point can be available in a variety of different manners, including, for example, look-up tables.

According to certain embodiments, such stored information can also reflect prior real-time measurements and/or machine-learned information. Such information obtained by the controller 118 can also include information or settings for at least some of the above-discussed variables associated with the ultrasonic welding generator 108 and/or applicator tool 106, including, for example, settings relating to the amplitude, frequency, voltage, and/or current that is to be outputted by the ultrasonic welding generator 108 and/or characteristics relating to the ultrasonic wave that is to be provided by operation of the transducer 168. Additionally, or alternatively, at least some, if not all, such variables may be determined by the controller 118, such as, for example via use of the information regarding the weld energy set point (Qt*), power curve, and/or the associated clamping force set point attained by the controller 118 and associated algorithms.

Based at least in part on information regarding the weld energy set point (Qt*) and/or the selected power curve, the controller 118 can determine or attain, such as, for example, from the memory 126 or a database, power supply set point information for a power supply 166, such as, for example, an AC power supply, that provides electrical power for the ultrasonic weld generator 108. Such power supply set point information can include, for example, a power supply voltage set point (V*) corresponding to a voltage that is to be outputted by the power supply 166, and/or which is to be provided to the transducer 168. Additionally, such power supply set point information can also include a power supply frequency set point (f*) that is to be outputted by the power supply 166 and/or which is to be provided to the transducer 168. Again, such power supply set point information may be selected based on at least attempting to attain the weld energy set point (Qt*), and/or the power curve profile that is known or estimated to result in the weld of the cable tie material 130 being able to provide the resulting cable tie 102 with certain characteristics, such as, for example, certain loop tensile strength characteristics, among other characteristics.

As seen in FIG. 5, the voltage (V) and high frequency signal (f) actually outputted from the power supply 166 can be transmitted to the transducer 168 of the ultrasonic welding generator 108, including, for example, a piezoelectric transducer. The transducer 168 can assist in converting the electrical power provided by the power supply 166 into an ultrasonic wave that can be used by the applicator tool 106 to weld the cable tie material 130 so as to at least assist in providing a closed cable tie 102 about the one or more cable bundles 104. As seen in FIG. 5, the ultrasonic wave can have both a magnitude (A) and a frequency (ω).

As also seen in FIG. 5, according to certain embodiments, the transducer 168, or other portion of the applicator tool 106, can output information regarding the electrical power (P), which may, for example, be in Watts (W), that was supplied to the transducer 168, to an estimator 170 of the feedback control system 132. Additionally, or alternatively, such electrical power information provided to the estimator 170 can also include, for example, but is not limited to, electrical voltage, wattage, and/or frequency that was received by and/or used by, the transducer 168. Additionally, or alternatively, the information provided to the estimator 170 can provide an indication of the ultrasonic wave outputted from the transducer 168, including, for example, the magnitude (A) and a frequency (ω) of the ultrasonic wave, among other information relating to the operation of the transducer 168. According to certain embodiments, the estimator 170 can use the information inputted to the estimator 170 to calculate, or derive from information accessible from the controller 118 and/or memory 126, such as, for example, look up tables, an estimated weld energy (Qt). The estimated weld energy (Qt), which can, for example, be represented in Joules (J), among other similar units of measurement, can provide an indication of the weld energy that is currently being delivered, and/or has been, delivered to the weld. Moreover, according to certain embodiments, this weld energy (Qt) can reflect an instantaneous weld energy that is being delivered to the weld, and/or indicate an accumulated weld energy that has been delivered to the weld. Using the determined estimated weld energy (Qt), the controller 118 can compare the estimated weld energy (Qt) with the weld energy set point (Qt*) to determine whether the weld energy set point (Qt*) and/or whether the estimated weld energy (Qt) that has been delivered at a certain point in time indicates that the weld energy will, within a certain time period, result in the accumulated dissipated energy at the weld site satisfying the weld energy set point (Qt*).

According to certain embodiments, such an evaluation or comparison can be used to determine a duration of time that the welding operation is to continue such that the accumulated weld energy that is delivered to the weld will satisfy the weld energy set point (Qt*). Additionally, or alternatively, the controller 118 can, based on an evaluation or comparison of the estimated weld energy (Qt) with the weld energy set point (Qt*), adjust certain parameters of the welding operation, including, for example, adjust the power supply voltage set point (V*), that is sent from the controller 118 to the power supply 166, and thereby adjust the power supply voltage (V) that is to be received, or drawn, by the transducer 168. Alternatively, rather than being employed in the current welding operation, such adjustments can be recorded, such as, for example, stored by the memory 126 or a database, and be available for improving subsequent welding operations. Moreover, such adjustments can, according to certain embodiments, be subsequently automatically utilized in subsequent welding operations, thereby providing the ultrasonic welding system 100 with a form of automatic machine learning.

Alternatively, the estimator 170 can provide an estimate of the power, in Watts, that is being, and/or has been delivered to the transducer 168 during the course of the welding operations, including, for example, at certain times during the welding operation. Such information can be used by the controller 118 in connection with the evaluating the current power dissipation with a selected power curve that had previously been attained from the memory 126, including, for example, a power curve profile such as that shown in FIG. 7, as previously discussed. Based on such a comparison, the controller 118 may determine whether variables in the welding operation, including, for example, variables relating to the power supply voltage and/or frequency (V, f) supplied by the power supply 166 should be modified so as to improve conformity with the power as a function of time shown in the selected power curve. According to certain embodiments, such adjustments can be utilized in the current welding operation. Alternatively, or additionally, such adjustments can be recorded, such as, for example, in the memory 126 or a database. Further such stored adjustments can, according to certain embodiments, automatically be utilized in subsequent welding operations, thereby providing the system with a form of automatic machine learning.

Additionally, other information regarding the welding operation, such as, for example, the duration of the welding operation, the welding parameters used for a particular weld(s), the operator, and/or the location at which the weld was performed, can also be recorded, such as, for example, in the memory 126 and/or a database, including, for example, a cloud based database.

According to certain embodiments, the controller 118 can determine that the welding operation is completed, and thus is to cease, upon determining that the estimated weld energy (Qt) satisfies the weld energy set point (Qt*), which, again, can correspond to an accumulated amount of dissipated energy. Alternatively, the controller 118 can determine the timing of ceasing the welding operation based on an evaluation of the power curve attained during the welding operation, or information therein, with the selected known prior power curve profile, or information therein. Additionally, while the forgoing is described with respect to evaluation using either the weld energy set point (Qt*) or a power curve(s), according to other embodiments, monitoring and/or control of the welding operation can utilize both the weld energy set point (Qt*) and power curves. For example, according to certain embodiments, the operation of the welding operation can be monitored and/or controller based on use of information provided by a power curve in view of characteristics of a known power curve(s), while the controller 118 can decide that the welding operation is to be terminated upon the estimated weld energy (Qt) satisfying an accumulated value for the weld energy set point (Qt*). Conversely, information regarding the estimated weld energy (Qt), in view of the weld energy set point (Qt*), can be used to control and/monitor the welding operation, with the controller 118 determining whether the weld operation is, or has been, completed based on information provided using at least a known power curve.

Figure 6:
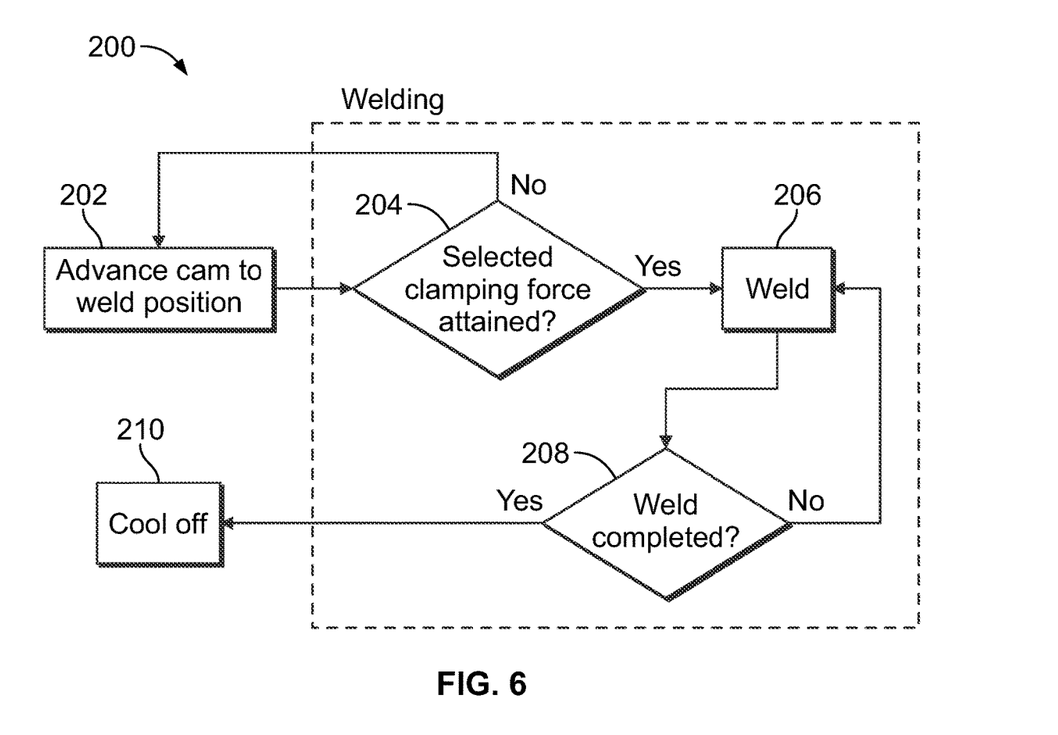
FIG. 6 illustrates a flow chart depicting an exemplary process for fastening a cable tie using an ultrasonic welding system having a feedback control system according to an illustrated embodiment of the subject application.

FIG. 6 illustrates a flow chart depicting an exemplary process 200 for fastening a cable tie 102 using an ultrasonic welding system 100 having a feedback control system 132 according to an illustrated embodiment of the subject application. The operations illustrated for all of the processes in the present application are understood to be examples only, and operations may be combined or divided, and added or removed, as well as re-ordered in whole or in part, unless explicitly stated to the contrary.

At step 202, with the anvil segments 154a, 154b of the pivotal arm segments 152a, 152b positioned between the cable tie material 130 and the adjacent cable bundle(s) 104, the cam 164 can be rotated via operation of the motor of the weld motor assembly 160 such that the tip 158 of the weld horn 156 is positioned, or advanced, against the adjacent cable tie material 130. Moreover, as discussed above, the weld horn 156 and associated tip 158 can be generally linearly displaced at step 202 such that a clamping force is exerted against at least a portion of the cable tie material 130 that is positioned between the tip 158 of the weld horn 156 and the anvil segments 154a, 154b of the pivotal arm segments 152a, 152b. Additionally, as also discussed above, according to certain embodiments, the extent to which the tip 158 of the weld horn 156 is displaced, and/or the associated displaced position of the weld horn 156 and/or tip 158, may be based on the displacement set point ($\Delta^*$) and the associated clamping force value (F1, F2, . . . Fn) that is to be attained from such displacement.

At step 204, upon the weld horn 156 and/or tip 158 reaching the displaced position, a determination can be made as to whether the clamping force (Fclamp) that is being exerted against the cable tie material 130 satisfies the clamping force set point. Again, such an evaluation can include attaining a clamping force value (F1), such as, for example, via use of a piezoelectric transducer and/or strain gauge, among other sensors. Further, while the determination of whether the current clamping force being exerted against the cable tie material 130 does, or does not, satisfy the clamping force set point can be determined by a variety of components of the ultrasonic welding system 100, according to the illustrated embodiment the determination can be made by the controller 118 of the control system 110.

If at step 204 a determination is made that the clamping force value (F1) corresponding to the clamping force that is currently being exerted against the cable tie material 130 does not satisfy the clamping force set point, then the process can return to step 202, and a signal or instruction can be communicated to again operate the motor of the weld motor assembly 160 in a manner that can facilitate operation of the cam 164. Moreover, in the event the clamping force being exerted against the cable tie material 130 is to be increased, the motor of the weld motor assembly 160 can be operated in a manner that causes the cam 164 to rotate in a direction that can further generally linearly displace the tip 158 of the weld horn 156 in a direction of the cable tie material 130 and/or the anvil segments 154a, 154b of the pivotal arm segments 152a, 152b that are positioned behind the cable tie material 130. Such rotation of the cam 164 and associated displacement of the tip 158 of the weld horn 156 can continue until the tip 158 reaches another position, or a degree of displacement of the cam 164, tip 158, and/or weld horn 156 is attained, that can correspond to a location at which the clamping force value (F2) associated with the current clamping force (Fclamp) that is now being exerted against the cable tie material 130 is predicted, estimated, and/or detected to satisfy the clamping force set point. This process of operating the cam 164 to adjust the clamping force on the cable tie material 130 can continue until the clamping force set point is satisfied.

Evaluation of whether the clamping force value (F1, F2, . . . Fn) satisfies the clamping force set point can include determining whether the clamping force value (F1, F2, . . . Fn) is lower than, or exceeds, the clamping force set point, or an associated range for the clamping force set point. Thus, for example, the process at step 204 can involve determining whether the clamping force being exerted against the cable tie material 130 is excessive such that degree of the current clamping force currently being against the cable tie material 130 should be reduced. In the event a determination is made that the clamping force currently being exerted against the cable tie material 130 is excessive, the process can return to step 202, during which the motor of the weld motor assembly 160 can be operated in a manner that causes the cam 164 to rotate in a direction that can displaces the tip 158 of the weld horn 156 in a direction generally away from the cable tie material 130 and/or the anvil segments 154a, 154b of the pivotal arm segments 152a, 152b that are positioned behind the cable tie material 130. Such rotation of the cam 164 and associated displacement of the tip 158 of the weld horn 156 can continue until the tip 158 reaches another position that can correspond to a location at which the clamping force being exerted against the cable tie material 130 can satisfy the clamping force set point.

At step 206, upon satisfaction of the clamping force set point, the ultrasonic welding of the cable tie material 130 can commence. As mentioned above with respect to FIG. 5, during such welding, the feedback control system 132 can be used to monitor whether the estimated weld energy (Qt) is, or is not, satisfying the weld energy set point (Qt*). As also previously discussed, during step 206, in the event the weld energy set point (Qt*) is not being satisfied, the controller 118 can make adjustments to the welding operating, including, for example, adjustments to the weld set point information so as to at least attempt to satisfy the weld energy set point (Qt*). Additionally, such adjustments can be stored and implemented into subsequent welding procedures, which can refine the welding operation and improve the quality and repeatability of subsequent welding of cable tie material 130.

As also seen in FIG. 6, at step 208, the controller 118 can monitor if the weld has been completed, and, if not completed, continue with the welding operation. Such a determination can, according to certain embodiments, include determining whether the accumulated ultrasonic energy that has been dissipated to the weld joint as satisfied the energy set point (Qt*) and/or whether a particular power curve has been attained.

At step 210, upon a determination by the controller 118 that that the weld has been completed, the applicator tool 138 can cease welding the cable tie material 130, and the cable tie material 130 can be given an opportunity to cool off. Such cooling can provide for the temperature of the weld to be reduced to a level that can prevent inadvertent damage to the newly formed weld. Such a period of cooling may also include time for the cable tie material 130 to be cut or trimmed, such as, for example, by use of a strap cutter 172 of the guide system 146, from other portions of the cable tie material 130, thereby detaching the formed cable tie 102 from the cable tie material 130 that remains coupled to the spool 128. The first jaw 134a of the applicator tool 106 can also be moved to the open position, as indicated by the broken lines shown in FIG. 4A, and the cable bundle 104 with the newly formed cable tie 102 can be moved away from applicator tool 106, or vice versa.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore, it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. A feedback control system for welding an object, the feedback control system comprising:
   an ultrasonic weld generator;
   an applicator tool adapted to receive an ultrasonic wave generated by the ultrasonic weld generator to ultrasonically weld a portion of the object, the applicator tool having a weld horn and a first pivotal arm and a second pivotal arm, the first pivotal arm having a first anvil segment and the second pivotal arm having a second anvil segment, and the first pivotal arm and the second pivotal arm being selectively displaceable to respective positions at which at least the portion of the object is located between the first anvil segment and the second anvil segment, and between a tip of the weld horn, the weld horn being displaceable to selectively, and adjustably, exert a clamping force against the portion of the object;
   a controller adapted to, using at least one of a weld energy set point and a reference power curve, generate a signal indicating a voltage set point and a frequency set point for an electrical power that is to be drawn by the ultrasonic welding generator;
   a sensor adapted to measure the clamping force being exerted against the portion of the object, the controller further adapted to (a) determine if the clamping force measured by the sensor satisfies a clamping force set point, (b) generate, if the clamping force does not satisfy the clamping force set point, a signal that adjusts a position of at least the weld horn relative to the object so as to adjust the clamping force being exerted against the portion of the object, and (c) delay commencement of the object being ultrasonically welded until the clamping force exerted against the portion of the object satisfies the clamping force set point; and
   an estimator coupled to the ultrasonic weld generator and the controller, the estimator adapted to estimate at least one of the following: (a) a weld energy dissipated to a weld site at which the portion of the object is being ultrasonically welded, and (b) a shape of a power curve corresponding to an electrical power drawn by the ultrasonic weld generator during the ultrasonic welding of the portion of the object, and
   wherein the controller is further adapted to determine, based on at least one of the weld energy or the power curve estimated by the estimator, whether the ultrasonic welding of the portion of the object is completed.

2. The feedback control system of claim 1, wherein the sensor is a piezoelectric transducer of the ultrasonic weld generator.

3. The feedback control system of claim 1, wherein the applicator tool is electrically coupled to the ultrasonic weld generator via a cable.

4. The feedback control system of claim 1, wherein the ultrasonic weld generator is configured to convert low-frequency electricity to high-frequency electricity.

5. The feedback control system of claim 4, wherein the low-frequency electricity comprises 50 to 60 Hz.

6. The feedback control system of claim 4, wherein the high-frequency electricity comprises 20 to 40 KHz.

7. The feedback control system of claim 1, wherein the applicator tool further includes at least one jaw pivotably displaceable between a closed position and an open position to selectively define an aperture having a size to accommodate at least a portion of one or more cable bundles.

8. The feedback control system of claim 7, wherein the at least one jaw comprises a first jaw and a second jaw, wherein at least one of the first jaw and the second jaw is pivotably displaceable relative the other of the first jaw and the second jaw between the closed position and the open position to define the aperture.

9. The feedback control system of claim 1, wherein the object being ultrasonically welded is one or more loops of cable tie material.

10. The feedback control system of claim 9, wherein the first pivotal arm and the second pivotal arm can be pivotal from a respective first position to a respective second position, wherein, in the respective second position, at least a portion of the first anvil segment and the second anvil segment are positioned between the cable tie material and an adjacent portion of at least a portion of one or more cable bundles.

11. The feedback control system of claim 1, wherein the signal that adjusts the position of at least the weld horn to adjust the clamping force is applied to a motor, the motor being coupled to a cam.

12. The feedback control system of claim 11, wherein the motor, based on results of the measured clamping force prior to the welding of the portion of the object, can increase or decrease the clamping force exerted onto the portion of the object by the weld horn by rotating the cam.

13. The feedback control system of claim 11, wherein the controller is configured to determine, using the clamping force set point, a displacement set point for the displacement of at least the weld horn.

14. The feedback control system of claim 13, wherein the displacement set point corresponds to a displacement of the cam based on at least one of an angular position, degree of rotation, and a number of rotations.

15. The feedback control system of claim 1, wherein the ultrasonic weld generator further comprises:
   a transducer configured to detect changes in electrical response indicative of a change in state of the weld site.

16. The feedback control system of claim 15, wherein the changes in the electrical response of the transducer include at least one of changes in power, voltage, current draw, and resonant frequency.

17. The feedback control system of claim 16, wherein the changes in the electrical response of the transducer further include mechanical impedance of the object at the weld site.

* * * * *